(12) United States Patent
Hiramoto et al.

(10) Patent No.: US 9,100,639 B2
(45) Date of Patent: Aug. 4, 2015

(54) LIGHT FIELD IMAGING DEVICE AND IMAGE PROCESSING DEVICE

(75) Inventors: Masao Hiramoto, Osaka (JP); Yasunori Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 315 days.

(21) Appl. No.: 13/882,523

(22) PCT Filed: Sep. 4, 2012

(86) PCT No.: PCT/JP2012/005581
§ 371 (c)(1),
(2), (4) Date: Apr. 30, 2013

(87) PCT Pub. No.: WO2013/042323
PCT Pub. Date: Mar. 28, 2013

(65) Prior Publication Data
US 2013/0215231 A1    Aug. 22, 2013

(30) Foreign Application Priority Data

Sep. 20, 2011    (JP) .................. 2011-204828

(51) Int. Cl.
*H04N 13/02*    (2006.01)
*G02B 27/00*    (2006.01)
(Continued)

(52) U.S. Cl.
CPC .................. *H04N 13/02* (2013.01); *G02B 3/00* (2013.01); *G02B 27/0075* (2013.01);
(Continued)

(58) Field of Classification Search
USPC ......... 348/46, 47, 48, 49, 50, 64, 73, 77, 173, 348/207.99, 222.1, 227.1, 231.99, 237, 272, 348/294, 340, 344, 345, 366, 371, 658, 714, 348/719; 356/4.05, 123, 125, 364, 603, 356/606; 382/103, 154, 302
See application file for complete search history.

(56) References Cited

U.S. PATENT DOCUMENTS 6,807,295 B1    10/2004 Ono
2002/0084422 A1*    7/2002 Kienzle et al. ......... 250/396 ML
(Continued)

FOREIGN PATENT DOCUMENTS

JP    62-217790 A    9/1987
JP    62-291292 A    12/1987
(Continued)

OTHER PUBLICATIONS

International Search Report for corresponding International Application No. PCT/JP2012/005581 mailed Dec. 11, 2012.
(Continued)

*Primary Examiner* — Jefferey Harold
*Assistant Examiner* — Mustafizur Rahman
(74) *Attorney, Agent, or Firm* — Renner, Otto, Boisselle & Sklar, LLP (57) ABSTRACT

This image capture device includes: an image sensor 2 including first and second types of pixels that have mutually different spectral transmittance characteristics; a light-transmitting section 1 that is arranged to face the imaging area of the image sensor 2; and an imaging section 3 that includes at least a first imaging area having a first focal length and a second imaging area having a second focal length that is longer than the first focal length. The light-transmitting section 1 has a first light-transmitting area 1a comprised of multiple partial areas that are separated from each other and a second light-transmitting area 1b having a different spectral transmittance characteristic from the first light-transmitting area 1a. The distance from the light-transmitting section 1 to the imaging section 3 is equal to the first focal length f1 and the distance from the imaging area of the image sensor 2 to the imaging section 3 is equal to the second focal length f2.

20 Claims, 5 Drawing Sheets

(51) Int. Cl.
*G02B 3/00* (2006.01)
*G06T 7/00* (2006.01)
*H04N 5/225* (2006.01)
*H04N 9/04* (2006.01)
*G03B 35/10* (2006.01)

(52) U.S. Cl.
CPC ............ *G03B 35/10* (2013.01); *G06T 7/0065* (2013.01); *H04N 5/225* (2013.01); *H04N 9/045* (2013.01); *H04N 13/0271* (2013.01); *G06T 2207/10052* (2013.01); *H04N 13/0217* (2013.01)

(56) References Cited

U.S. PATENT DOCUMENTS

| | | | |
|---|---|---|---|
| 2002/0171740 A1 | 11/2002 | Seo | |
| 2002/0175151 A1* | 11/2002 | Ohta et al. | 219/121.69 |
| 2003/0169354 A1* | 9/2003 | Aotsuka | 348/272 |
| 2004/0252380 A1* | 12/2004 | Kashima | 359/656 |
| 2005/0103973 A1* | 5/2005 | Abe | 250/201.3 |
| 2006/0083504 A1* | 4/2006 | Matsusaka | 396/72 |
| 2007/0223792 A1* | 9/2007 | Morimoto et al. | 382/126 |
| 2007/0285672 A1* | 12/2007 | Mukai et al. | 356/603 |
| 2009/0273688 A1* | 11/2009 | Nonaka et al. | 348/222.1 |
| 2009/0284627 A1 | 11/2009 | Bando et al. | |
| 2010/0066812 A1 | 3/2010 | Kajihara et al. | |
| 2011/0116006 A1* | 5/2011 | Masuda et al. | 349/61 |
| 2011/0194014 A1* | 8/2011 | Ozaki | 348/340 |

FOREIGN PATENT DOCUMENTS

| | | |
|---|---|---|
| JP | 11-098532 A | 4/1999 |
| JP | 2001-016611 A | 1/2001 |
| JP | 2002-344999 A | 11/2002 |
| JP | 2003-134533 A | 5/2003 |
| JP | 2008-167395 A | 7/2008 |
| JP | 2009-276294 A | 11/2009 |

OTHER PUBLICATIONS

Ng et al., "Light Field Photography with a Hand-held Plenoptic Camera", Stanford Tech Report CTSR Feb. 2005.

* cited by examiner

LIGHT FIELD IMAGING DEVICE AND IMAGE PROCESSING DEVICE

TECHNICAL FIELD

The present application relates to a single-lens 3D image capturing technology for generating a multi-viewpoint image using a single optical system and a single image sensor.

BACKGROUND ART

Recently, the performance and functionality of digital cameras and digital movie cameras that use some solid-state image sensor such as a CCD or a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to such a so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as a "multi-viewpoint image") by using a single camera have been researched and developed. Such a method is called a "single-lens image capturing method".

For example, Patent Documents Nos. 1 and 2 disclose a method for obtaining a multi-viewpoint image by using two polarizers, of which the transmission axes cross each other at right angles, and a rotating polarization filter. Meanwhile, Patent Documents Nos. 3 to 5 disclose a method for obtaining a multi-viewpoint image by using a diaphragm (light beam confining plate) with multiple color filters.

The methods disclosed in these Patent Documents Nos. 1 to 5 are used mostly to generate a multi-viewpoint image using a single-lens camera. On the other hand, there is a technique for getting depth information using a single-lens camera with multiple micro lenses and for changing the focus position of the image captured freely based on that information. Such a technique is called "light field photography" and a single-lens camera that uses such a technique is called a "light field camera". In a light field camera, a number of micro lenses are arranged on an image sensor. Each of those micro lenses is arranged so as to cover a plurality of pixels. By calculating information about the direction of incoming light based on the image information gotten through the image capturing session, the subject's depth can be estimated. Such a camera is disclosed in Non-Patent Document No. 1, for example.

The light field camera can calculate depth information. But its resolution is determined by the number of micro lenses and should be lower than the resolution determined by the number of pixels of the image sensor, which is a problem. Thus, to overcome such a problem, Patent Document No. 6 discloses a technique for increasing the resolution using two image capturing systems. According to such a technique, the incoming light is split into two divided incoming light beams, which are imaged by two image capturing systems, of which the groups of micro lenses are arranged so as to spatially shift from each other by a half pitch, and then the images captured in this manner are synthesized together, thereby increasing the resolution. However, this technique requires two image capturing systems, thus causing size and cost problems, too.

To grapple with such a problem, Patent Document No. 7 discloses a technique for changing the modes of operation from a normal shooting mode into the light field photography mode, or vice versa, using a single image capturing system. According to this technique, a micro lens, of which the focal length varies according to the voltage applied, is used. Specifically, the focal length of the micro lens is set to be the infinity in the former mode and set to be a predetermined length in the latter mode. By adopting such a mechanism, an image with high resolution and depth information can be obtained. According to this technique, however, not only a mechanism to change the focal length of a micro lens and a mechanism for controlling the former mechanism are required but also a high resolution image and depth information cannot be obtained at the same time, which is a problem.

CITATION LIST

Patent Literature

Patent Document No. 1: Japanese Laid-Open Patent Publication No. 62-291292
Patent Document No. 2: Japanese Laid-Open Patent Publication No. 62-217790
Patent Document No. 3: Japanese Laid-Open Patent Publication No. 2002-344999
Patent Document No. 4: Japanese Laid-Open Patent Publication No. 2009-276294
Patent Document No. 5: Japanese Laid-Open Patent Publication No. 2003-134533
Patent Document No. 6: Japanese Laid-Open Patent Publication No. 11-98532
Patent Document No. 7: Japanese Laid-Open Patent Publication No. 2008-167395

Non-Patent Literature

Non-Patent Document No. 1: Ren Ng et al., "Light Field Photography with a Hand-held Plenoptic Camera", Stanford Tech Report CTSR 2005-02

SUMMARY OF INVENTION

Technical Problem

With the light field camera, depth information can be certainly obtained but the resolution of the resultant image decreases, which is a problem. To overcome the problem, the optical system should be modified as in the techniques disclosed in Patent Documents Nos. 6 and 7. Even if the optical system was modified, however, two image capturing systems would be needed or a high-resolution image and depth information could not be obtained at the same time.

Thus, to overcome such a problem, the present application provides an image capturing technique, by which a high-resolution image and depth information can be obtained at the same time using a different optical system and a different kind of signal processing than the ones adopted in the related art.

Solution to Problem

To overcome this problem, a light field image capture device according to an aspect of the present invention includes: an image sensor in which a plurality of unit blocks, each including first and second types of pixels that have mutually different spectral transmittance characteristics, are arranged on an imaging area; a light-transmitting section which is arranged so as to face the imaging area of the image sensor and which has a first light-transmitting area comprised of multiple partial areas that are separated from each other and a second light-transmitting area having a different spectral transmittance characteristic from the first light-transmitting area; and an imaging section which includes at least a first imaging area having a first focal length and a second imaging area having a second focal length that is longer than the first focal length. The distance from the light-transmitting section to the imaging section is equal to the first focal length and the distance from the imaging area of the image sensor to the imaging section is equal to the second focal length.

Advantageous Effects of Invention

According to an embodiment of the present invention, an image can be captured so as to be focused on the imaging area of the image sensor and image information represented by the light that has been incident on one of the two light-transmitting areas can be separated from image information represented by the light that has been incident on the other light-transmitting area. As a result, subject's depth information and a high resolution image can be obtained at the same time based on these pieces of image information.

DESCRIPTION OF EMBODIMENTS

Exemplary embodiments of the present invention are outlined as follows:

(1) A light field image capture device according to an aspect of the present invention includes: an image sensor in which a plurality of unit blocks, each including first and second types of pixels that have mutually different spectral transmittance characteristics, are arranged on an imaging area; a light-transmitting section that is arranged so as to face the imaging area of the image sensor and that has a first light-transmitting area comprised of multiple partial areas that are separated from each other and a second light-transmitting area having a different spectral transmittance characteristic from the first light-transmitting area; and an imaging section that includes at least a first imaging area having a first focal length and a second imaging area having a second focal length that is longer than the first focal length. The distance from the light-transmitting section to the imaging section is equal to the first focal length and the distance from the imaging area of the image sensor to the imaging section is equal to the second focal length.

(2) In one embodiment of the light field image capture device of (1), the spectral transmittance characteristics of the first and second types of pixels are the same as the spectral transmittance characteristics of the first and second light-transmitting areas, respectively.

(3) In one embodiment of the light field image capture device of (1) or (2), the multiple partial areas are surrounded with the second light-transmitting area.

(4) In one embodiment of the light field image capture device of one of (1) to (3), the multiple partial areas are arranged at regular intervals to form a matrix pattern.

(5) In one embodiment of the light field image capture device of one of (1) to (4), each of the multiple partial areas has a circular shape.

(6) In one embodiment of the light field image capture device of one of (1) to (5), a micro lens is arranged on one side of the first light-transmitting area so as to be located closer to a light source.

(7) In one embodiment of the light field image capture device of one of (1) to (6), first and second functions representing the spectral transmittance characteristics of the first and second light-transmitting areas, respectively, both have multiple local maximum values in a visible radiation wavelength range, and waveforms at which one of the two functions has the local maximum values are different from wavelengths at which the other function has the local maximum values.

(8) In one embodiment of the light field image capture device of one of (1) to (7), at least one of the first and second functions representing the spectral transmittance characteristics of the first and second light-transmitting areas has local maximum values in wavelength ranges representing the colors red, green and blue.

(9) In one embodiment of the light field image capture device of one of (1) to (8), one of the spectral transmittance characteristics of the first and second light-transmitting areas has no wavelength dependence.

(10) In one embodiment of the light field image capture device of (9), one of the first and second light-transmitting areas is transparent.

(11) In one embodiment of the light field image capture device of one of (1) to (8), the second light-transmitting area is a set of multiple color filters.

(12) In one embodiment of the light field image capture device of (11), the multiple color filters are either a combination of magenta and green filters or a combination of red, green and blue filters.

(13) In one embodiment of the light field image capture device of one of (1) to (12), each said unit block of the image sensor further includes third and fourth types of pixels that sense light rays in mutually different colors.

(14) In one embodiment of the light field image capture device of one of (1) to (12), the first type of pixels are comprised of a pixel that senses a light beam ray within the color red wavelength range, a pixel that senses a light beam ray within the color green wavelength range, and a pixel that senses a light beam ray within the color blue wavelength range, and the second type of pixel is a single pixel that senses a light beam ray within each of the colors red, green and blue wavelength ranges.

(15) In one embodiment of the light field image capture device of one of (1) to (14), the first imaging area is located in a peripheral portion of the imaging section and the second imaging area is located in a central portion of the imaging section.

(16) In one embodiment, the light field image capture device of one of (1) to (15) further includes: a first light-transmitting member that is arranged on one side of the first imaging area so as to be located closer to the light source and that has the same spectral transmittance characteristic as the first light-transmitting area; and a second light-transmitting member that is arranged on one side of the second imaging area so as to be located closer to the light source and that has the same spectral transmittance characteristic as the second light-transmitting area.

(17) In one embodiment, the light field image capture device of one of (1) to (16) further includes an image processing section that generates first image information and second image information that are represented by light beams that have been incident on the first and second light-transmitting areas, respectively, based on pixel signals supplied from the first and second types of pixels.

(18) In one embodiment of the light field image capture device of (17), the image processing section generates subject's depth information based on the first image information.

(19) In one embodiment of the light field image capture device of (17) or (18), each said unit block of the image sensor further includes third and fourth types of pixels that sense light beams in mutually different colors, and the image processing section generates a color image based on pixel signals supplied from the third and fourth types of pixels and the second image information.

(20) An image processing apparatus according to another aspect of the present invention generates first image information represented by a light beam that is going to be incident on the first light-transmitting area and second image information represented by a light beam that is going to be incident on the second light-transmitting area based on signals supplied from the light field image capture device of one of (1) to (19).

Hereinafter, more specific embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image" in the following description.

Embodiment 1

Figure 1:
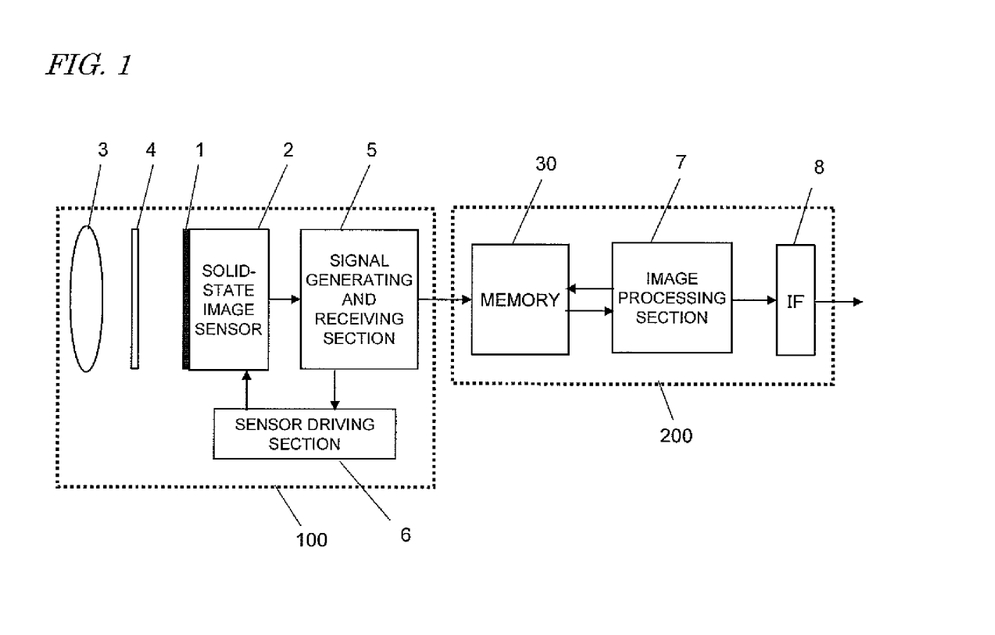
FIG. 1 A diagram illustrating a general configuration for an image capture device according to first to third embodiments.

First of all, an image capture device as a first embodiment of the present invention will be described. FIG. 1 is a block diagram illustrating a general configuration for a light field image capture device according to this embodiment (which will be simply referred to herein as an "image capture device"). The image capture device of this embodiment is a digital electronic camera and includes an image capturing section 100 and a signal processing section 200 that generates a signal representing an image (i.e., an image signal) based on the signal generated by the image capturing section 100.

The image capturing section 100 includes a color solid-state image sensor 2 (which will be simply referred to herein as an "image sensor") with a number of photosensitive cells that are arranged on its imaging area, a light-transmitting plate (light-transmitting section) 1 with two light-transmitting areas, which the respective transmittances have mutually different wavelength dependences (i.e., which have different spectral transmittance characteristics), a circular optical lens 3 which produces an image on the imaging area 2a of the image sensor 2, and an infrared cut filter 4. The image capturing section 100 further includes a signal generating and receiving section 5, which not only generates a fundamental signal to drive the image sensor 2 but also receives the output signal of the image sensor 2 and sends it to the signal processing section 200, and a sensor driving section 6 which drives the image sensor 2 in accordance with the fundamental signal generated by the signal generating and receiving section 5. The image sensor 2 is typically a CCD or CMOS sensor, which may be fabricated by known semiconductor device processing technologies. The signal generating and receiving section 5 and the sensor driving section 6 may be implemented as an LSI such as a CCD driver.

The signal processing section 200 includes an image processing section 7 which processes the output signal of the image capturing section 100 to generate a high-resolution image and depth information, a memory 30 which stores various kinds of data for use to generate the image signal, and an image interface (I/F) section 8 which sends out the high-resolution image and depth information thus generated to an external device. The image processing section 7 may be a combination of a hardware component such as a known digital signal processor (DSP) and a software program for use to perform image processing involving the image signal generation. Alternatively, the image processing section 7 may also be implemented as a dedicated piece of hardware. The memory 30 may be a known semiconductor memory such as a DRAM or an SRAM. And the memory 30 not only stores the signal supplied from the image capturing section 100 but also temporarily retains the image data that has been generated by the image processing section 7 or compressed image data. These image data are then output to either a storage medium or a display section (neither is shown) by way of the image interface section 8.

The image capture device of this embodiment actually further includes an electronic shutter, a viewfinder, a power supply (or battery), a flashlight and other known components. However, description thereof will be omitted herein, because none of them are essential components that should be described in detail to allow the reader to understand how the present invention works. Also, this configuration is only an example. Thus, in this embodiment, additional components other than the light-transmitting plate 1, the image sensor 2 and the image processing section 7 may be implemented as an appropriate combination of known elements.

With such a configuration adopted, the incoming light is passed through the optical lens 3, the infrared cut filter 4 and the light-transmitting plate 1 and then imaged and photoelectrically converted by the image sensor 2 at the imaging area 2a. Next, the image signal that has been photoelectrically converted is sent to the image processing section 7 via the signal generating and receiving section 5. This image signal is separated by the image processing section 7 into image signals represented by light beams that have been incident on the respective areas of the light-transmitting plate 1, thereby generating a high-resolution image and depth information. These pieces of information thus generated are then output to an external device through the image interface section 8.

Figure 2:
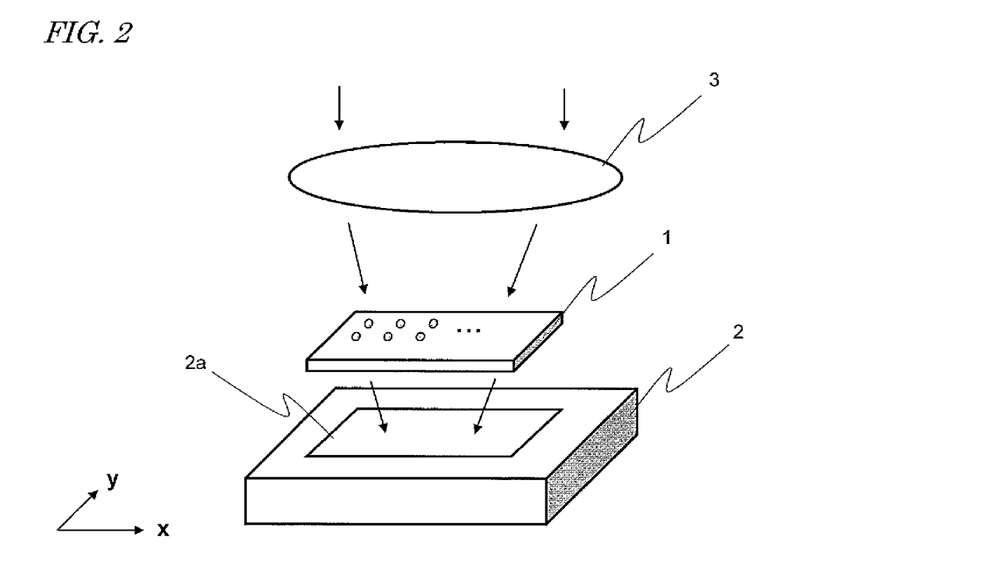
FIG. 2 A schematic representation illustrating the relative arrangement of an optical lens, a light-transmitting plate and an image sensor according to the first embodiment.

FIG. 2 schematically illustrates the relative arrangement of the optical lens 3, light-transmitting plate 1, and the image sensor 2 in the image capturing section 100. It should be noted that illustration of the other elements is omitted in FIG. 2. Also, those elements illustrated in FIG. 2 are simplified ones and their sizes and shapes and the intervals between them are not necessarily to scale compared to the actual ones. For example, the optical lens 3 may be a lens unit that is a group of lenses but is drawn in FIG. 2 as a single lens for the sake of simplicity. Also, even though the light-transmitting plate 1 and the image sensor 2 are illustrated in FIG. 2 as being separated from each other, the light-transmitting plate 1 and the image sensor 2 may be integrated together. In the following description, the xy coordinates shown in FIG. 2 will be used.

Figure 3:
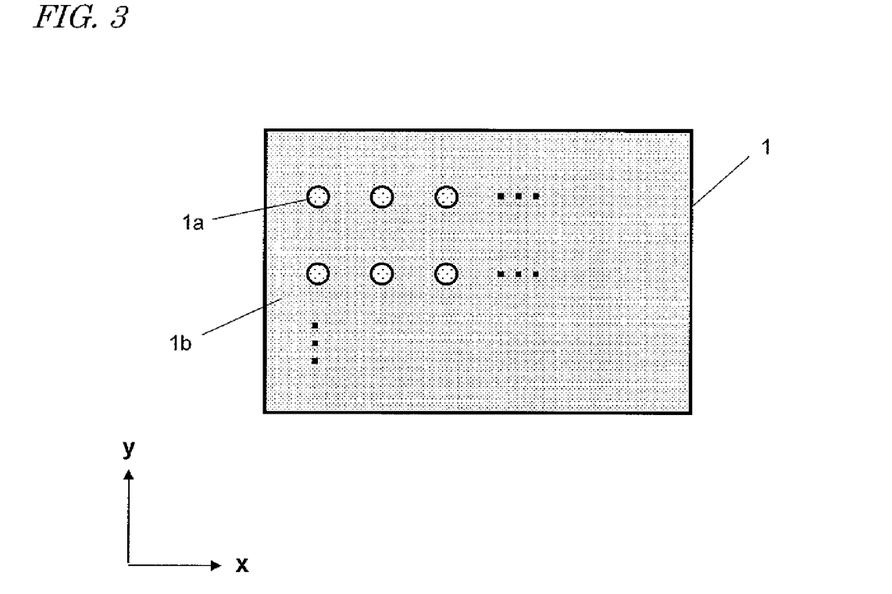
FIG. 3 A front view of the light-transmitting plate according to the first embodiment.

FIG. 3 is a front view of the light-transmitting plate 1 according to this embodiment. The light-transmitting plate 1 has light-transmitting areas 1a which are very small partial areas in the shape of pinholes and a light-transmitting area 1b which is the rest of the light-transmitting plate 1. These two kinds of light-transmitting areas 1a and 1b have mutually different spectral transmittance characteristics. In this embodiment, each of those partial areas of the light-transmitting areas 1a has a circular shape and are arranged at regular intervals in both of the x and y directions. Even though the ratio of the overall planar area of the light-transmitting areas 1a to the planar area of the light-transmitting area 1b is approximately one to ten, this is just an example of the present invention and any other ratio may be adopted as well.

Each of these partial areas may have a size of approximately 10 to 20 μm in diameter and the arrangement interval between them may be set to be approximately 40 to 50 μm. The respective partial areas are suitably arranged so that when the light-transmitting plate 1 is projected onto the imaging area 2a of the image sensor 2, the center of each of those partial areas is aligned with that of any of the multiple pixels. However, the number, shape, size and arrangement interval of the partial areas that are the light-transmitting areas 1a do not have to be the ones adopted in this example. Rather, the light-transmitting areas 1a may also have any other configuration as long as the light-transmitting areas 1a have at least two partial areas that are separated from each other and as long as the light beams that have been transmitted through those areas produce multiple images with parallax of the same subject on the imaging area 2a of the image sensor 2. As long as those multiple images have been produced, the depth can also be calculated by making pattern matching and an analysis to find how much each pair of corresponding points is removed from the center of their images as will be described later. Furthermore, each of those partial areas of the light-transmitting areas 1a does not have to have a circular shape, either.

Figure 4:
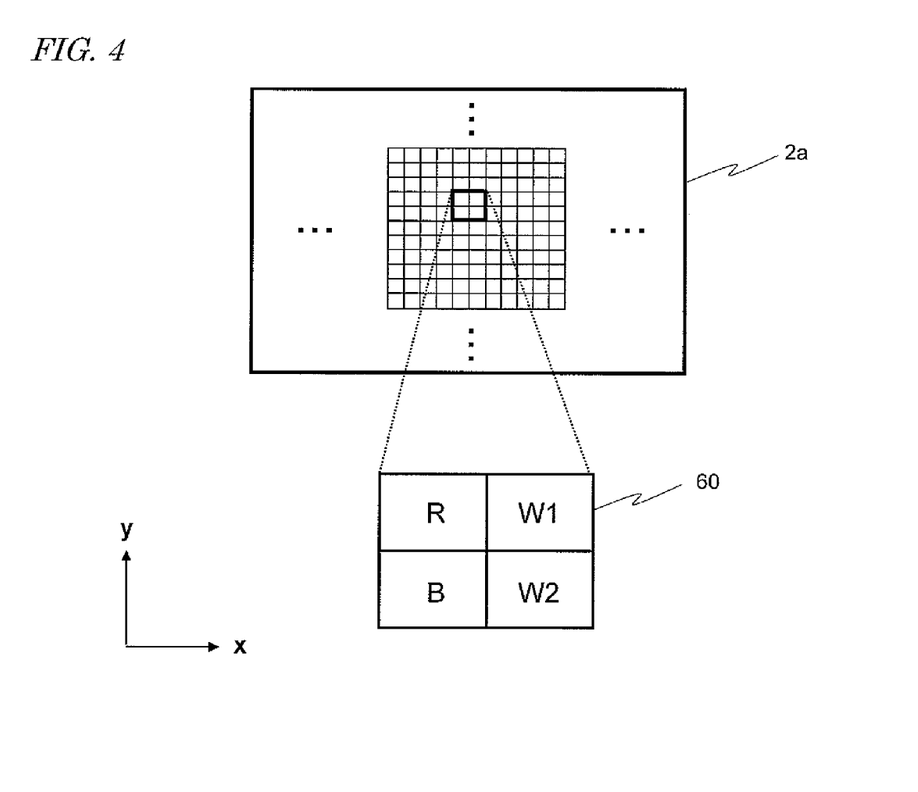
FIG. 4 A diagram illustrating the basic color scheme of a color solid-state image sensor according to the first embodiment.

FIG. 4 illustrates some of a number of pixels that are arranged in columns and rows on the imaging area 2a of the image sensor 2. In this embodiment, four pixels form a single unit block 60 and a plurality of such unit blocks 60 are arranged on the imaging area 2a. A single pixel includes a photosensitive cell and a transmitting filter which is arranged closer to the light source so as to face the photosensitive cell.

In this description, such a combination of a single photosensitive cell and a single transmitting filter which is arranged to face the photosensitive cell will be referred to herein as a "pixel". Each of those photosensitive cells typically includes a photodiode, which performs photoelectric conversion and outputs an electrical signal representing the quantity of the light received (which will be referred to herein as a "photoelectrically converted signal" or a "pixel signal").

As shown in FIG. 4, in this embodiment, the transmitting filters are arranged in two columns and two rows. Specifically, a red element R is arranged at the row 1, column 1 position, a blue element B is arranged at the row 2, column 1 position, a transparent element W1 is arranged at the row 1, column 2 position, and a transparent element W2 is arranged at the row 2, column 2 position.

In this case, the red and blue elements R and B are filters that transmit mainly light beams falling within the colors red and blue wavelength ranges, respectively. In this description, a wavelength range of approximately 400 to 500 nm is defined to be the color blue wavelength range, a wavelength range of approximately 500 to 600 nm is defined to be the color green wavelength range, and a wavelength range of approximately 600 to 700 nm is defined to be the color red wavelength range. However, these definitions are made just for the sake of convenience, and it may be determined in any other way what wavelength range represents what color.

The transparent elements W1 and W2 have mutually different spectral transmittance characteristics. These elements W1 and W2 are not quite transparent but are designed so as to transmit a light beam representing any of the colors red, green and blue components at least partially. In this embodiment, the transparent element W1 and a photosensitive cell that faces the element W1 corresponds to the first type of pixel, and the transparent element W2 and a photosensitive cell that faces the element W2 corresponds to the second type of pixel.

The number of pixels and the pixel size of the image sensor 2 may be selected arbitrarily. If the size of each pixel were too small, however, the sensitivity would decrease and the accuracy of pattern matching to be described later would decline, too. That is why a pixel size that is not too small should be selected to avoid the sensitivity problem. In this embodiment, the effective area of the imaging area is supposed to have a size of 6.4 mm×4.8 mm and the number of pixels is supposed to be 1.5 million as an example.

The light-transmitting areas 1a and 1b of the light-transmitting plate 1 and the transparent elements W1 and W2 of the image sensor 2 may be made of a multilayer dielectric film, for example. By using such a multilayer dielectric film, a transmitting filter, of which the transmittance becomes either a local maximum or a local minimum with respect to light with any intended wavelength, can be made. Meanwhile, the red and blue elements R and B of the image sensor 2 may be made of a known pigment, for example.

Figure 5:
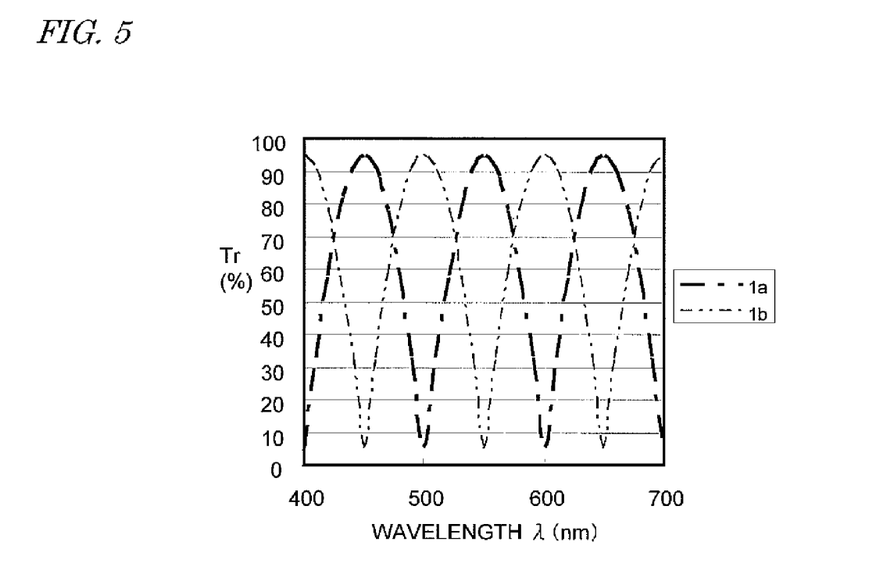
FIG. 5 A graph showing the spectral transmittance characteristics of the light-transmitting plate according to the first embodiment.

FIG. 5 is a graph showing the spectral transmittance characteristics of the light transmitting areas 1a and 1b of the light-transmitting plate 1 of this embodiment. In FIG. 5, the abscissa represents the wavelength λ (nm) and the ordinate represents the transmittance TR (%). As shown in FIG. 5, the spectral transmittance characteristic of the light transmitting area 1a is approximately the square of a trigonometric function Sin, and the spectral transmittance characteristic of the light transmitting area 1b is approximately the square of a trigonometric function Cos. That is to say, these two curves have similar waveforms but their phases are different from each other by 90 degrees. In this embodiment, the image capture device is designed so that the spectral transmittance characteristic of the transparent element W1 of the image sensor 2 is the same as the characteristic of the light transmitting area 1a and that the spectral transmittance characteristic of the transparent element W2 is the same as the characteristic of the light transmitting area 1b. As can be seen, each of the functions representing the spectral transmittance characteristics of the light-transmitting areas 1a and 1b and transparent elements W1 and W2 of this embodiment has local maximum values in the colors red, green and blue wavelength ranges.

The light-transmitting plate 1 may be made in the following manner, for example. First of all, multiple stacks of thin-film dielectric materials with mutually different refractive indices (that form a multilayer dielectric film) are formed on a first transparent substrate, thereby defining the first (group of) light-transmitting areas 1a. Meanwhile, a multilayer dielectric film with a different spectral transmittance characteristic is made at the positions where the first light-transmitting areas 1a are not located, thereby defining the second light-transmitting area 1b. And then by bonding these two structures together, the light-transmitting plate 1 can be obtained.

The transparent elements W1 and W2 of the image sensor 2 may be formed by patterning approximately ten thin films of dielectric materials, for example. If some of those thin films have different thicknesses between the transparent elements W1 and W2, the expected spectral transmittance characteristics are realized.

Figure 6:
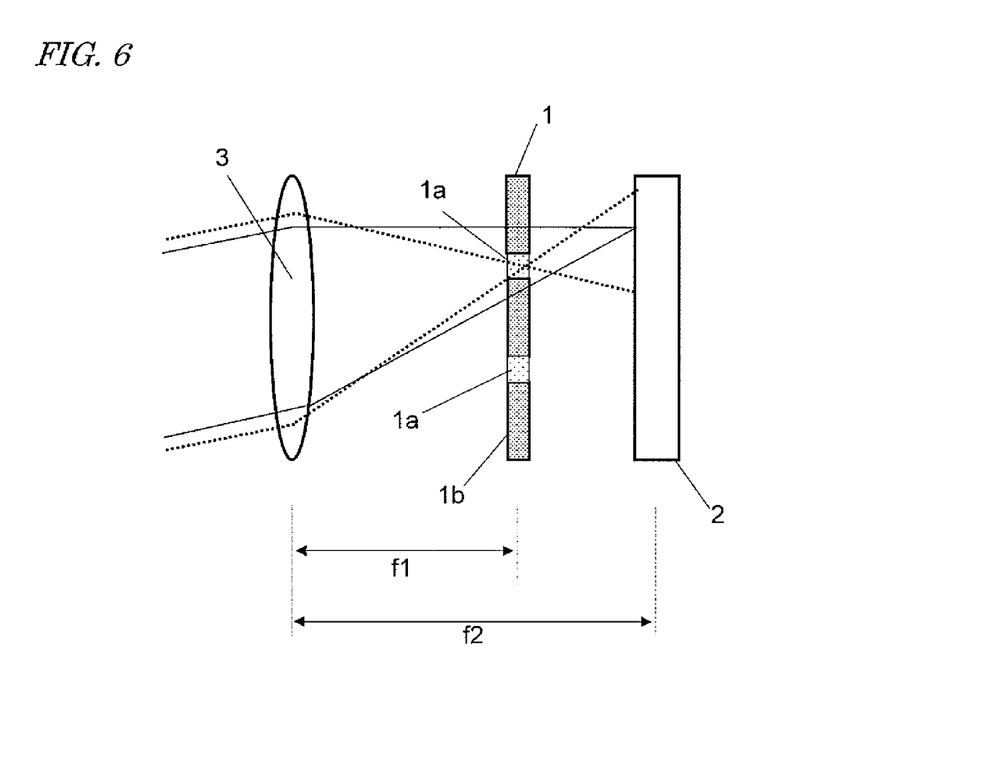
FIG. 6 A view generally illustrating how light is imaged by the optical lens according to the first embodiment.

FIG. 6 illustrates generally how the optical lens 3 images the incoming light. In this embodiment, the optical lens 3 is a lens with a long focal length, and the light-transmitting plate 1 and the imaging area 2a of the image sensor 2 both fall within the focal range of the optical lens 3. More specifically, the optical lens 3 has locally varying curvatures. Thus, a light ray that has passed through a peripheral portion of the optical lens 3 (which will be referred to herein as a "first imaging area") is imaged on the light-transmitting plate 1, while a light ray that has passed through the inner portion of the optical lens 3 (which will be referred to herein as a "second imaging area") is imaged on the imaging area 2a of the image sensor 2. In other words, the focal length f1 of the first imaging area is equal to the distance between the optical lens 3 and the light-transmitting plate 1, and the focal length f2 of the second imaging area is equal to the distance between the optical lens 3 and the imaging area 2a of the image sensor 2. As can be seen, even though the optical lens 3 of this embodiment is a single lens, the optical lens 3 has two or more focal points. It should be noted that when we say that some distance is equal to one focal length, the distance and the focal length may naturally be exactly equal to each other but the distance could be at most 15% longer or shorter than the focal length as well. Even though the optical lens 3 is supposed to be designed in this embodiment so as to have the shorter focal length in the peripheral portion and the longer focal length in the central portion, this is only an example and the optical lens 3 may be any other optical system with two or more focal lengths.

In FIG. 6, the dotted line indicates a light ray that is focused on the light-transmitting plate 1, while the solid line indicates a light ray that is focused on the imaging area 2a of the image sensor 2. The former light ray produces a so-called "pinhole image" that has been transmitted through the light-transmitting area 1a. This pinhole image is a simply magnified version of the image that has been produced at the light-transmitting area 1a. On the other hand, the latter light ray produces an image with the highest resolution. As can be seen from this situation, at each pixel (photosensitive cell) of the image sensor 2, both a pinhole image and a high-resolution image can be obtained at the same time.

Hereinafter, the operation of capturing a subject image through the light-transmitting plate 1 and the signal processing to be carried out by the image processing section 7 will be described. In the following description, a signal represented by the light that has been transmitted through the R element of the image sensor 2 and then photoelectrically converted will be identified herein by Rs. A signal represented by the light that has been transmitted through its B element and then photoelectrically converted will be identified herein by Bs. A signal represented by the light that has been transmitted through its W1 element and then photoelectrically converted will be identified herein by W1s. And a signal represented by the light that has been transmitted through its W2 element and then photoelectrically converted will be identified herein by W2s.

The red and blue components of the light that has come from the subject are passed through the light-transmitting area 1a or 1b of the light-transmitting plate 1, the lens 3, the infrared cut filter 4 and the red element R or the blue element B and then photoelectrically converted by the image sensor 2, thereby generating signals Rs and Bs. In the same way, the white component (i.e., all of the red, green and blue components) of the light that has come from the subject is passed through the W1 and W2 elements of the image sensor 2 and photoelectrically converted, thereby generating signals W1s and W2s, of which the levels are different because the quantities of light incident on the light-transmitting areas 1a and 1b are different. The reason is that the W1 and W2 elements have mutually different spectral transmittance characteristics, which are the same as the characteristics of the light-transmitting areas 1a and 1b, respectively. Supposing the ratio of the overall planar area of the light-transmitting areas 1a to the planar area of the light-transmitting area 1b is one to one, the W1 element transmits more profusely the light that has been transmitted through the light-transmitting areas 1a than the light that has been transmitted through the light-transmitting area 1b. On the other hand, the W2 element transmits more profusely the light that has been transmitted through the light-transmitting area 1b than the light that has been transmitted through the light-transmitting areas 1a.

Hereinafter, the photoelectrically converted signals W1s and W2s of this embodiment will be described. First of all, a signal W1as represented by the light that has been transmitted through the light-transmitting areas 1a of the light-transmitting plate 1 and the W1 element and then photoelectrically converted and a signal W1bs represented by the light that has been transmitted through the light-transmitting area 1b and the W1 element and then photoelectrically converted will be described. As described above, the transmittance of the light-transmitting areas 1a and the W1 element is approximately proportional to the square of the trigonometric function Sin, and the transmittance of the light-transmitting area 1b and the W2 element is approximately proportional to the square of the trigonometric function Cos. The photoelectric conversion efficiency including those factors of proportionality is supposed to be k. And the ratio of the overall planar area of the light-transmitting areas 1a to the planar area of the light-transmitting area 1b is supposed to be 1 to S. In this case, achromatic light with the same intensity (i.e., light with no wavelength dependence) is supposed to be incident on the light-transmitting areas 1a and 1b. In that case, the signal W1as is proportional to the integral of the transmittances of the light-transmitting areas 1a and the W1 element, and therefore, is calculated by the following Equation (1). On the other hand, the signal W1bs is proportional to the integral of the transmittances of the light-transmitting area 1b and the W1 element, and therefore, is calculated by the following Equation (2). In this case, the integration is supposed to be performed over the entire wavelength range of visible radiation (e.g., $\lambda$=400 to 700 nm):

$$W1as = k\int \sin^2[(\lambda-400)\pi/100] \sin^2[(\lambda-400)\pi/100]d\lambda \quad (1)$$

$$W1bs = kS\int \cos^2[(\lambda-400)\pi/100] \sin^2[(\lambda-400)\pi/100]d\lambda \quad (2)$$

In this case, if the interval of integration is supposed to be 400 to 700 nm of visible radiation and if the data is replaced with data including an angle $\theta$=0 radians when the wavelength $\lambda$ is 400 nm or data including an angle $\theta=\pi$ radians when the wavelength $\lambda$ is 500 nm in order to facilitate the calculations of Equations (1) and (2), these Equations (1) and (2) can be rewritten into the following Equations (3) and (4), respectively:

$$W1as = 6k\int_0^{\pi/2} \sin^2\theta \times \sin^2\theta d\theta \quad (3)$$

$$W1bs = 6kS\int_0^{\pi/2} \cos^2\theta \times \sin^2\theta d\theta \quad (4)$$

These Equations (3) and (4) are further modified into the following Equations (5) and (6), respectively:

$$W1as = 6k\int_0^{\pi/2} \sin^4\theta\, d\theta \quad (5)$$
$$= 6k\int_0^{\pi/2} \left(\frac{1-\cos 2\theta}{2}\right)^2 d\theta$$
$$= 6k\int_0^{\pi/2} \frac{1-2\cos 2\theta + \cos^2 2\theta}{4} d\theta$$
$$= \frac{3k}{2}\left(\frac{\pi}{2} + \int_0^{\pi/2} \frac{1+\cos 4\theta}{2} d\theta\right)$$
$$= \frac{9k\pi}{8}$$

$$W1bs = 6kS\int_0^{\pi/2} \frac{(\sin 2\theta)^2}{4} d\theta \quad (6)$$
$$= 6kS\int_0^{\pi/2} \frac{1-\cos 4\theta}{8} d\theta$$
$$= \frac{3kS\pi}{8}$$

In the same way, the signal W2as is proportional to the integral of the transmittances of the light-transmitting areas 1a and the W2 element, and therefore, can be represented by the following Equation (7). On the other hand, the signal W2bs is proportional to the integral of the transmittances of the light-transmitting area 1b and the W2 element, and therefore, can be represented by the following Equation (8):

$$W2as = k\int \cos^2[(\lambda-400)\pi/100] \sin^2[(\lambda-400)\pi/100]d\lambda \quad (7)$$

$$W2bs = kS\int \cos^2[(\lambda-400)\pi/100] \cos^2[(\lambda-400)\pi/100]d\lambda \quad (8)$$

In this case, since the integration operation on the right side of Equation (7) is the same as the integration operation on the right side of Equation (2), their results should be equal to each other. As for Equation (8), if the calculation is made with the variable of integration $\lambda$ changed into $\theta$ as in the example described above, the result obtained will be as represented by the following Equation (9):

$$W2bs = 6kS\int_0^{\pi/2} \cos^4\theta\, d\theta \quad (9)$$
$$= 6kS\int_0^{\pi/2} \left(\frac{1+\cos 2\theta}{2}\right)^2 d\theta$$
$$= 6kS\int_0^{\pi/2} \frac{1+2\cos 2\theta + \cos^2 2\theta}{4} d\theta$$
$$= \frac{3kS}{2}\left(\frac{\pi}{2} + \int_0^{\pi/2} \frac{1+\cos 4\theta}{2} d\theta\right)$$
$$= \frac{9kS\pi}{8}$$

As can be seen from these results, W1as:W1bs=1:S/3 and W2as:W2bs=1/3:S. Actually, light rays with the same intensity are not incident on the light-transmitting areas 1a and 1b. That is why signals representing the intensities of light rays to be transmitted through the light-transmitting areas 1a and 1b and then photoelectrically converted by pixels of interest when the light-transmitting areas 1a and 1b and the W1 and W2 elements are all supposed to be totally transparent are identified by IMG(a) and IMG(b). In that case, the relation between those signals and the pixel signals W1s and W2s is represented by the following Equation (10), from which the factors of proportionality are omitted:

$$\begin{pmatrix} W1s \\ W2s \end{pmatrix} = \begin{pmatrix} 1 & S/3 \\ 1/3 & S \end{pmatrix} \begin{pmatrix} IMG(a) \\ IMG(b) \end{pmatrix} \quad (10)$$

Furthermore, by multiplying both sides of this Equation (10) by the inverse matrix of the 2×2 matrix on the right side of Equation (10), the following Equation (11) can be obtained:

$$\begin{pmatrix} IMG(a) \\ IMG(b) \end{pmatrix} = \frac{9}{8S}\begin{pmatrix} S & -S/3 \\ -1/3 & 1 \end{pmatrix} \begin{pmatrix} W1s \\ W2s \end{pmatrix} \quad (11)$$

By making the calculation of this Equation (11), the image processing section 7 obtains signal components represented by the light rays that have been incident on the light-transmitting areas 1a and 1b based on the pixel signals W1s and W2s on a unit block basis. As a result, images to be produced by the light rays that have been incident on the respective areas can be generated. In addition, depth information can be calculated by using the pinhole images obtained through the light-transmitting areas 1a. Specifically, since the relative geometric arrangement of the optical lens 3, the group of pinholes (i.e., the light-transmitting areas 1a) and the image sensor 2 is known in advance, the depth information can be calculated based on their relative arrangement and the magnitude of parallax between one pinhole image and its surrounding pinhole image.

In this description, the "pinhole images" refer herein to images that are based on the images produced on the imaging area 2a by light rays that have been transmitted through respective partial areas of the light-transmitting areas 1a. The image represented by the signal IMG(a) can be said to be a set of multiple pinhole images. These pinhole images represent the same subject but do have parallax due to a difference in position between the respective partial areas. Thus, by detecting that parallax, depth information can be calculated. For example, one pinhole image A and an adjacent pinhole image B share the same partial image in common. Suppose it has turned out, by detecting that partial image by known pattern matching method, that the partial image detected is located at a distance of XA from the center of the pinhole image A and at a distance of XB from the center of the pinhole image B, respectively. In that case, their difference |XA−Xb| represents the magnitude of parallax. Since the magnitude of parallax varies according to the subject's depth, the depth can be calculated based on the magnitude of parallax by obtaining either theoretically and experimentally the relation between the magnitude of parallax and the depth in advance.

On the other hand, IMG(b) obtained as a result of the arithmetic processing is used as a high-resolution image. However, since an image based on the signal IMG(b) does not include information about the light that has been transmitted through the light-transmitting areas 1a, that information is missing. That is why to further improve the image quality, part or all of the information carried by the signal IMG(a) may be added to the information carried by the signal IMG(b). That is to say, a high-resolution image may be generated by using a signal IMG(b)+k'IMG(a) instead of the signal IMG(b) where k' is an integer of 0 to 1.

Next, color signal processing to generate a high-resolution image will be described. Among the pixel signals W1s, W2s, Rs and Bs obtained from the image sensor 2, IMG(b) or IMG(a)+k'IMG(b) obtained by making the calculation described above is processed as a luminance signal, while Rs and Bs are processed as color signals. The pixel signals obtained by the image sensor 2 are sent to the image processing section 7, where two image signals IMG(a) and IMG(b) are generated based on the pixel signals W1s and W2s by Equation (11) described above. The image processing section 7 calculates the luminance signal YL by YL=IMG(b)+k'× IMG(a), thereby generating color difference signals (Rs−YL) and (Bs−YL). After having had their white balance adjusted, these color difference signals are used as a composite color image signal.

Thereafter, by performing the matrix operation processing represented by the following Equation (12), the image processing section 7 generates RGB signals. In this case, the R, G and B signals to generate are identified by cIMG(r), cIMG(g) and cIMG(b), respectively, and the matrix coefficients are identified by M11 through M33, which are known values that have been obtained in advance through simulations:

$$\begin{pmatrix} cIMG(r) \\ cIMG(g) \\ cIMG(b) \end{pmatrix} = \begin{pmatrix} M11 & M12 & M13 \\ M21 & M22 & M23 \\ M31 & M32 & M33 \end{pmatrix} \begin{pmatrix} YL \\ Rs-YL \\ Bs-YL \end{pmatrix} \quad (12)$$

As described above, the image capture device of this embodiment uses an image sensor 2 including an optical lens 3 with a long focal length, a light-transmitting plate 1 having two kinds of areas with mutually different spectral transmittance characteristics, one of which is a group of pinhole areas, and two kinds of transparent elements which have the same optical properties as the light-transmitting plate 1. By adopting such an arrangement, not just can the depth information be calculated but also can a high-resolution image be obtained as well. Furthermore, the high-resolution image can also be colorized, which is very advantageous.

In the embodiment described above, not only the transparent elements W1 and W2 but also the red and blue elements R and B as color element are used. However, these color elements are not necessarily used but any other combination of color elements may also be used as long as they represent mutually different colors. For example, the red and blue elements R and B may be replaced with any of a green element G which mainly transmits a green ray, a yellow element Ye which mainly transmits red and green rays, a cyan element Cy which mainly transmits green and blue rays, and a magenta element Mg which mainly transmits red and blue rays. Also, if no color high-definition image is needed, then the image processing section 7 does not have to perform color image generation processing and the image sensor 2 does not have to include the red and blue elements R and B, either. In addition, the arrangement of pixels shown in FIG. 4 does not always have to be adopted.

Furthermore, there is no problem even if the spectral transmittance characteristics of the light-transmitting areas 1a and 1b of the light-transmitting plate 1 and the transparent elements W1 and W2 of the image sensor 2 are not approximate to the trigonometric function shown in FIG. 5 as long as the matrix to be calculated by Equation (10) can have its inverse matrix obtained with the spectral transmittance characteristics. In other words, there is no problem as long as the photosensitive cell that faces the element W1 and the photosensitive cell that faces the element W2 both receive light in which the light rays transmitted through the first light-transmitting areas 1a and the light ray transmitted through the second light-transmitting area 1b are superposed one upon the other and as long as those photosensitive cells receive mutually different quantities of light. For example, the spectral transmittance characteristic of one of these light-transmitting areas 1a and 1b may have no wavelength dependence. Furthermore, either the light-transmitting areas 1a or the light-transmitting area 1b may be transparent. In this description, "to be transparent" refers herein to the property of having a transmittance of 85% or more with respect to any of the colors red, green and blue components.

Optionally, micro lenses may be arranged so as to face the light-transmitting areas 1a of the light-transmitting plate 1. Even if micro lenses are arranged to face the light-transmitting areas 1a, the effects of the embodiment described above can also be achieved. If the micro lenses are provided, the light condensing effect can be further enhanced. As a result, the sensitivity increases, the image obtained becomes brighter, and therefore, the depth can be calculated more accurately by the image matching technique described above, which is beneficial.

Furthermore, not the entire light-transmitting area 1b of the light-transmitting plate 1 has to have a uniform spectral transmittance characteristic but the light-transmitting area 1b may have locally different spectral transmittance characteristics, too. For example, the light-transmitting area 1b may be a set of multiple color filters. As the multiple color filters, a combination of magenta and green filters or a combination of red, green and blue filters may be used, for example. By adopting such a configuration, the light-transmitting area 1b as a whole may have the same characteristic as that of the embodiment described above.

Embodiment 2

Next, a second embodiment of the present invention will be described. This second embodiment is the same as the first embodiment described above except that the optical lens 3 and the image sensor 2 of this embodiment have a different basic color scheme from that of the first embodiment. Thus, the following description of the second embodiment will be focused on that difference from the first embodiment and their common features will not be described all over again.

Figure 7:
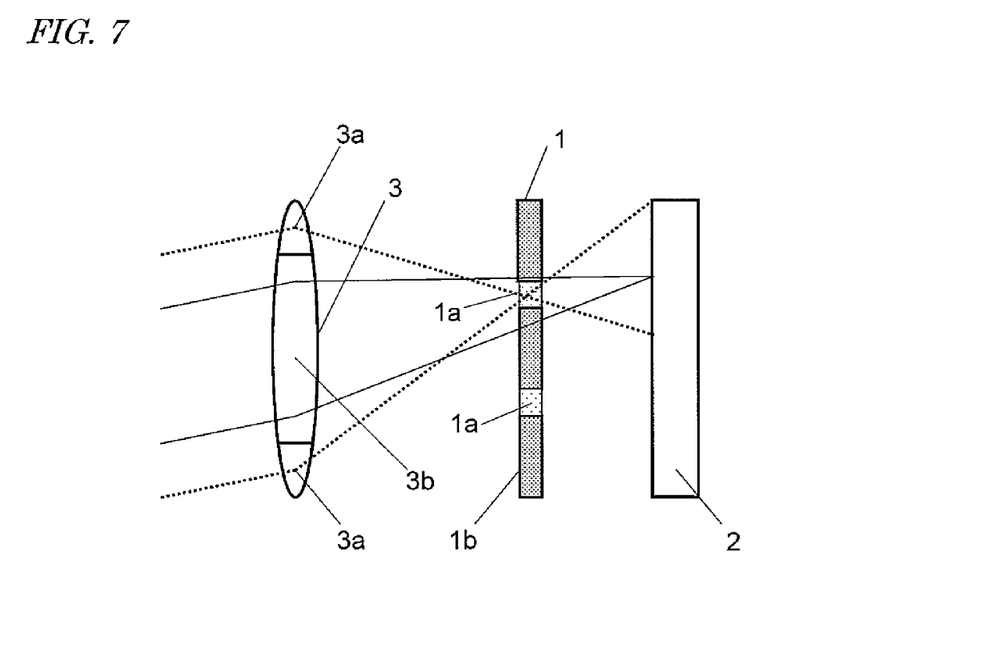
FIG. 7 A view generally illustrating how light is imaged by the optical lens according to the second embodiment.

FIG. 7 illustrates how the incoming light is imaged by the optical lens 3 of this embodiment. In this embodiment, the optical lens 3 has different focal lengths on its peripheral portion 3a and its central portion 3b. Specifically, the lens peripheral portion 3a has a relatively short focal length and the lens central portion 3b has a relatively long focal length.

With such a property taken into account, the optical lens 3, the light-transmitting plate 1 and the image sensor 2 are arranged so that the light that has come from the subject and passed through the lens peripheral portion 3a is focused on the light-transmitting plate 1 and that the light that has come from the subject and passed through the lens central portion 3b is focused on the imaging area 2a of the image sensor 2.

Figure 8:
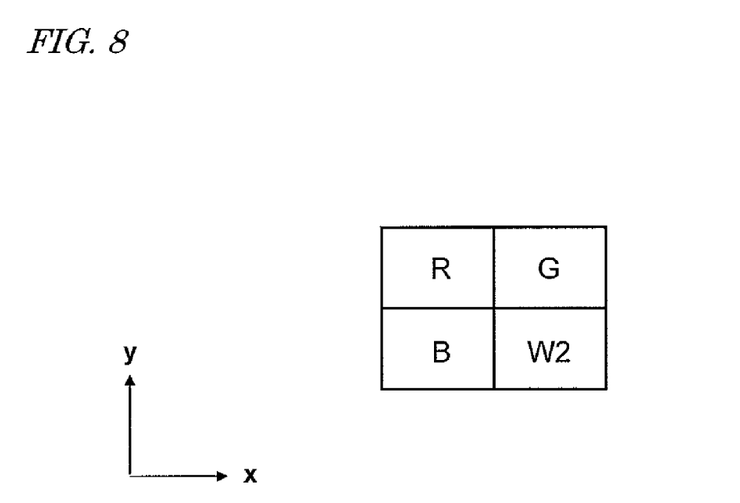
FIG. 8 A diagram illustrating the basic color scheme of a color solid-state image sensor according to the second embodiment.

FIG. 8 illustrates the basic color scheme of the image sensor 2 of this embodiment. Its color scheme is basically comprised of four elements that are arranged in two columns and two rows, and a red element (R) is arranged at the row 1, column 1 position, a blue element B is arranged at the row 2, column 1 position, a green element G is arranged at the row 1, column 2 position, and a transparent element W2 is arranged at the row 2, column 2 position. The transparent element W2 is the same as the transparent element W2 of the first embodiment. In this case, the spectral transmittance characteristic of the B element is the same as the characteristic of the light-transmitting area 1a in the range of 400 to 500 nm shown in FIG. 5, the spectral transmittance characteristic of the G element is the same as the characteristic of the light-transmitting area 1a in the range of 500 to 600 nm shown in FIG. 5, and the spectral transmittance characteristic of the R element is the same as the characteristic of the light-transmitting area 1a in the range of 600 to 700 nm shown in FIG. 5. That is to say, the sum of the respective spectral transmittance characteristics of the R, G and B elements is the same as the characteristic of the light-transmitting areas 1a and the transparent element W1 of the first embodiment described above. Meanwhile, the light-transmitting plate 1 is the same as that of the first embodiment described above. In this embodiment, the R, G and B elements and three photosensitive cells that face those elements correspond to the first type of pixels, while the W2 element and the photosensitive cell that face it correspond to the second type of pixel.

Hereinafter, the signal processing of this embodiment will be described in comparison with the processing of the first embodiment described above. In the first embodiment, the image sensor 2 has the W1 element and its signal is used. On the other hand, according to this embodiment, instead of using the W1 element, the sum of the respective signals supplied from the R, G and B elements is handled as a W1s signal. Then, the arithmetic processing to be performed on the W1 and W2 elements becomes quite the same as that of the first embodiment. As a result, the image signal IMG(a) represented by the light rays that have been transmitted through the light-transmitting areas 1a and the image signal IMG(b) of the light ray that has been transmitted through the light-transmitting area 1b are represented by Equation (11) in this embodiment, too.

The image can also be colorized in quite the same way as in the first embodiment described above. Specifically, first, the image processing section 7 makes signals IMG(a) and IMG(b) based on the signals W1s and W2s, thereby generating a luminance signal YL (=IMG(b)+k'×IMG(a)) and color difference signals (Rs−YL) and (Bs−YL). After having had their white balance adjusted, these color difference signals are regarded as a composite color image signal. After that, the matrix operation represented by Equation (12) is performed, thereby generating R, G and B signals. Optionally, instead of performing such colorization processing, the image processing section 7 may process the pixel signals Rs, Gs and Bs as red, green and blue color signals as they are.

As can be seen, according to this embodiment, using an optical lens 3 with mutually different focal lengths in its peripheral and central portions 3a and 3b, the optical lens 3, the light-transmitting plate 1 and the image sensor 2 are arranged so that the light transmitted through the lens peripheral portion 3a is focused on the light-transmitting plate 1 and that the light transmitted through the lens central portion 3b is focused on the imaging area 2a of the image sensor 2. And by setting the sum of the respective spectral transmittance characteristics of the R, G and B elements of the image sensor 2 to be the same as the characteristic of the light-transmitting area 1a shown in FIG. 5, the effects of the first embodiment can be achieved, too.

In the embodiment described above, the basic color scheme of the image sensor 2 is supposed to include R, G, B and W2 elements as shown in FIG. 8. Alternatively, the scheme shown in FIG. 4 may also be adopted as in the first embodiment described above. Also, the arrangement shown in FIG. 8 is not the only one and there is no problem even if the arrangement is changed. Furthermore, the spectral transmittance characteristics of the light-transmitting plate 1 and the image sensor 2 do not have to be the ones described above as long as when the matrix is calculated by Equation (10), its inverse matrix can be obtained. Nevertheless, if the result of the calculation represented by Equation (11) becomes a negative one, it is possible to prevent the result of the calculation from going negative by further multiplying the result by a matrix which changes the ratio of the matrix elements. Furthermore, even if micro lenses are arranged where the light-transmitting areas 1a of the light-transmitting plate 1 are supposed to be, the same effect can also be achieved.

Embodiment 3

Figure 9:
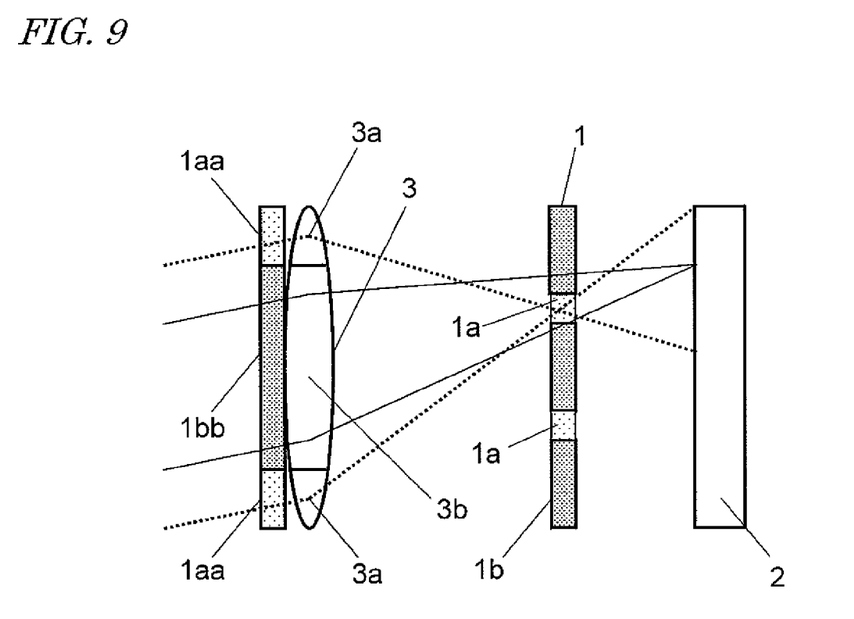
FIG. 9 A view generally illustrating how light is imaged by the optical lens according to the third embodiment.

Next, a third embodiment of the present invention will be described. In this embodiment, two kinds of light-transmitting members, of which the spectral transmittance characteristics are the same as those of the two kinds of light-transmitting areas of the light-transmitting plate 1, are arranged in front of the light incident surface (i.e., its front surface) of the optical lens 3 of the second embodiment. Specifically, as shown in FIG. 9, a light-transmitting member 1aa having the same spectral transmittance characteristic as the light-transmitting areas 1a of the light-transmitting plate 1 is arranged in front of the peripheral portion 3a of the lens 3, and a light-transmitting member 1bb having the same spectral transmittance characteristic as the light-transmitting area 1b of the light-transmitting plate 1 is arranged in front of the central portion 3b of the lens 3. In the other respects, the configuration and processing of this third embodiment are the same as those of the second embodiment.

By adopting such a configuration, the quantity of the light that has come from the lens central portion 3b to be incident on the light-transmitting areas 1a of the light-transmitting plate 1 and the quantity of the light that has come from the lens peripheral portion 3a to be incident on the light-transmitting area 1b of the light-transmitting plate 1 can be both reduced. As a result, the light that has been transmitted through the light-transmitting areas 1a and the light that has been transmitted through the light-transmitting area 1b can be separated from each other more perfectly, and the depth information can be calculated more accurately and the quality of the high-resolution image can be improved. The specific processing to be carried out in this embodiment is the same as what has already been described for the first and second embodiments, and its description will be omitted herein.

As can be seen, according to this embodiment, in addition to every component of the second embodiment, a light-transmitting member 1aa having the same spectral transmittance characteristic as the light-transmitting areas 1a of the light-transmitting plate 1 is arranged in front of the peripheral portion 3a of the optical lens 3 and a light-transmitting member 1bb having the same spectral transmittance characteristic as the light-transmitting area 1b of the light-transmitting plate 1 is arranged in front of the central portion 3b of the optical lens 3. By adopting such a configuration, the depth information can be calculated more accurately and the quality of the high-resolution image can be improved.

In the embodiments described above, image processing is supposed to be carried out by the image processing section 7 that is built in the image capture device. However, that image processing may also be carried out by another device which is provided independently of the image capture device. For example, the same effects can also be achieved even by inputting the signal that has been obtained by an image capture device including the image capturing section 100 of the embodiment described above to another device (e.g., image processor) and by getting a program defining the signal arithmetic processing described above executed by a computer built in that image processor. If the image processing is supposed to be carried out by such an external image processor, the image capture device does not need to include the image processing section.

INDUSTRIAL APPLICABILITY

A light field image capture device according to embodiments of the present invention can be used effectively in every camera that ever uses a solid-state image sensor, and may be used in digital cameras, digital camcorders and other consumer electronic cameras and in industrial surveillance cameras, to name just a few.

REFERENCE SIGNS LIST 1 light-transmitting plate
1a, 1b light-transmitting area
1aa, 1bb light-transmitting member
2 color solid-state image sensor
2a imaging area
3 optical lens
3a lens peripheral portion
3b lens central portion
4 infrared cut filter
5 signal generating and receiving section
6 sensor driving section
7 image processing section
8 image interface section
30 memory
100 image capturing section
200 signal processing section

The invention claimed is:

1. A light field image capture device comprising:
an image sensor in which a plurality of unit blocks, each including first and second types of pixels that have mutually different spectral transmittance characteristics, are arranged on an imaging area;
a light-transmitting section that is arranged so as to face the imaging area of the image sensor and that has a first light-transmitting area comprised of multiple partial areas that are separated from each other and a second light-transmitting area having a different spectral transmittance characteristic from the first light-transmitting area; and
an imaging section that includes at least a first imaging area having a first focal length and a second imaging area having a second focal length that is longer than the first focal length, and wherein the distance from the light-transmitting section to the imaging section is equal to the first focal length and the distance from the imaging area of the image sensor to the imaging section is equal to the second focal length.

2. The light field image capture device of claim 1, wherein the spectral transmittance characteristics of the first and second types of pixels are the same as the spectral transmittance characteristics of the first and second light-transmitting areas, respectively.

3. The light field image capture device of claim 1, wherein the multiple partial areas are surrounded with the second light-transmitting area.

4. The light field image capture device of claim 1, wherein the multiple partial areas are arranged at regular intervals to form a matrix pattern.

5. The light field image capture device of claim 1, wherein each of the multiple partial areas has a circular shape.

6. The light field image capture device of claim 1, wherein a micro lens is arranged on one side of the first light-transmitting area so as to be located closer to a light source.

7. The light field image capture device of claim 1, wherein first and second functions representing the spectral transmittance characteristics of the first and second light-transmitting areas, respectively, both have multiple local maximum values in a visible radiation wavelength range, and waveforms at which one of the two functions has the local maximum values are different from wavelengths at which the other function has the local maximum values.

8. The light field image capture device of claim 1, wherein at least one of the first and second functions representing the spectral transmittance characteristics of the first and second light-transmitting areas has local maximum values in wavelength ranges representing the colors red, green and blue.

9. The light field image capture device of claim 1, wherein one of the spectral transmittance characteristics of the first and second light-transmitting areas has no wavelength dependence.

10. The light field image capture device of claim 9, wherein one of the first and second light-transmitting areas is transparent.

11. The light field image capture device of claim 1, wherein the second light-transmitting area is a set of multiple color filters.

12. The light field image capture device of claim 11, wherein the multiple color filters are either a combination of magenta and green filters or a combination of red, green and blue filters.

13. The light field image capture device of claim 1, wherein each said unit block of the image sensor further includes third and fourth types of pixels that sense light rays in mutually different colors.

14. The light field image capture device of claim 1, wherein the first type of pixels are comprised of a pixel that senses a light beam ray within the color red wavelength range, a pixel that senses a light beam ray within the color green wavelength range, and a pixel that senses a light beam ray within the color blue wavelength range, and
wherein the second type of pixel is a single pixel that senses a light beam ray within each of the colors red, green and blue wavelength ranges.

15. The light field image capture device of claim 1, wherein the first imaging area is located in a peripheral portion of the imaging section and the second imaging area is located in a central portion of the imaging section.

16. The light field image capture device of claim 1, further comprising:
- a first light-transmitting member that is arranged on one side of the first imaging area so as to be located closer to the light source and that has the same spectral transmittance characteristic as the first light-transmitting area; and
- a second light-transmitting member that is arranged on one side of the second imaging area so as to be located closer to the light source and that has the same spectral transmittance characteristic as the second light-transmitting area.

17. The light field image capture device of claim 1, further comprising an image processing section that generates first image information and second image information that are represented by light beams that have been incident on the first and second light-transmitting areas, respectively, based on pixel signals supplied from the first and second types of pixels.

18. The light field image capture device of claim 17, wherein the image processing section generates subject's depth information based on the first image information.

19. The light field image capture device of claim 17, wherein each said unit block of the image sensor further includes third and fourth types of pixels that sense light beams in mutually different colors, and
wherein the image processing section generates a color image based on pixel signals supplied from the third and fourth types of pixels and the second image information.

20. An image processing apparatus that generates first image information represented by a light beam that is going to be incident on the first light-transmitting area and second image information represented by a light beam that is going to be incident on the second light-transmitting area based on signals supplied from the light field image capture device of claim 1.

* * * * *